United States Patent
Seibt et al.

(12) 
(10) Patent No.: US 10,336,250 B2
(45) Date of Patent: Jul. 2, 2019

(54) ORIENTATION FOR VISUALLY IMPAIRED PASSENGERS ON-BOARD A VEHICLE

(71) Applicant: Airbus Operations GmbH, Hamburg (DE)

(72) Inventors: Christian Seibt, Hamburg (DE); Jens Wiebalck, Hamburg (DE)

(73) Assignee: Airbus Operations GmbH (DE)

( * ) Notice: Subject to any disclaimer, the term of this patent is extended or adjusted under 35 U.S.C. 154(b) by 607 days.

(21) Appl. No.: 14/322,175

(22) Filed: Jul. 2, 2014

(65) Prior Publication Data

US 2015/0015025 A1     Jan. 15, 2015

(30) Foreign Application Priority Data

Jul. 9, 2013   (EP) ..................................... 13175757

(51) Int. Cl.
  *B60Q 9/00*          (2006.01)
  *G09B 21/00*        (2006.01)
  (Continued)

(52) U.S. Cl.
  CPC ............... *B60Q 9/00* (2013.01); *A61H 3/061* (2013.01); *A61H 3/066* (2013.01); *B64D 11/02* (2013.01);
  (Continued)

(58) Field of Classification Search
  CPC .. G09B 21/003; G09B 21/007; G09B 21/008; B64D 2045/007; B64D 45/00; B64D 11/00; B60Q 9/00
  (Continued)

(56) References Cited

U.S. PATENT DOCUMENTS 3,408,025 A * 10/1968 Davis ....................... A62B 3/00
                                                                 182/230
5,284,444 A *  2/1994 Raynes ................ G09B 21/007
                                                                 434/113
(Continued)

FOREIGN PATENT DOCUMENTS

CA         874554 A    6/1971
CN    102762455 A   10/2012
(Continued)

OTHER PUBLICATIONS

U.S. Appl. No. 14/322,150, filed Jul. 2, 2014.
(Continued)

*Primary Examiner* — James B Hull
(74) *Attorney, Agent, or Firm* — Lerner, David, Littenberg, Krumholz & Mentlik, LLP (57) ABSTRACT

To provide improved guidance for visually impaired passengers in lavatory situations on-board of vehicles, a vehicle guidance system for guiding visually impaired passengers on-board a vehicle is provided. The vehicle guidance system includes an interior space on-board the vehicle with at least one lavatory with enclosing cabin walls, and at least one guiding sanitary-handrail. The guiding sanitary-handrail is mounted along at least a part of the enclosing cabin walls inside the lavatory. The guiding sanitary-handrail is provided as a tactile guide. Further, the guiding handrail is provided with visually highlighted information and manually touchable information, both related to cabin information. Still further, a plurality of operating elements for controlling functions of the lavatory is provided inside the lavatory, and at least a part of the operating elements is arranged on the guiding sanitary-handrail.

13 Claims, 5 Drawing Sheets

(51) Int. Cl.
*A61H 3/06* (2006.01)
*B64D 11/02* (2006.01)
*E03D 5/10* (2006.01)
*E03D 9/00* (2006.01)
*E03C 1/05* (2006.01)

(52) U.S. Cl.
CPC ............... *E03C 1/05* (2013.01); *E03D 5/10* (2013.01); *E03D 9/00* (2013.01); *G09B 21/003* (2013.01); *G09B 21/007* (2013.01); *A61H 2003/063* (2013.01); *A61H 2003/065* (2013.01)

(58) Field of Classification Search
USPC .................................................. 434/112, 113
See application file for complete search history.

(56) References Cited

U.S. PATENT DOCUMENTS

| | | | | |
|---|---|---|---|---|
| 5,331,918 | A | | 7/1994 | Honigsbaum |
| 5,347,434 | A | | 9/1994 | Drake |
| 5,366,050 | A | * | 11/1994 | Raynes ................ G09B 21/003 182/18 |
| 5,612,665 | A | | 3/1997 | Gerhardsen |
| 5,810,597 | A | | 9/1998 | Allen, Jr. et al. |
| 6,754,917 | B1 | * | 6/2004 | Rhoades ............... A61G 7/1007 4/667 |
| 2006/0248762 | A1 | | 11/2006 | Moore |
| 2008/0219012 | A1 | | 9/2008 | Kessler et al. |
| 2010/0192435 | A1 | | 8/2010 | Miscamble et al. |
| 2013/0001359 | A1 | | 1/2013 | Schliwa et al. |

FOREIGN PATENT DOCUMENTS

| | | | |
|---|---|---|---|
| DE | 10 2005 039 651 A1 | | 3/2007 |
| DE | 10 2011 109390 A1 | | 2/2013 |
| JP | H10057433 A | | 3/1998 |
| JP | 200397005 A | * | 9/2001 |
| JP | 2001 299646 A | | 10/2001 |
| JP | 2001299646 A | * | 10/2001 |
| JP | 2002219078 A | * | 8/2002 |
| JP | 2003097005 A | | 4/2003 |
| JP | 2005 016287 A | | 1/2005 |
| JP | 2005 226230 A | | 8/2005 |
| JP | 2006 255143 A | | 9/2006 |
| JP | 2011 152233 A | | 8/2011 |
| KR | 2012 0115678 A | | 10/2012 |
| KR | 101240599 B1 | | 3/2013 |
| WO | 2011/086502 A1 | | 7/2011 |

OTHER PUBLICATIONS

"Able data", Raynes Rail (http://www.abledata.com/abledata.cfm?pageid=19327&top=32589&ksectionid=1932 . . . Jun. 14, 2013).

BrailleWise Aircraft Toilet, Hong Kong Polytechnic University, Technology Frontier, Issue Jan. 2013.

"Raynes Rail" (Coco Raynes Associates, Inc.) <http://www.raynesassociates.com/universal-design-raynes-rail-braille-rail Jun. 14, 2013>.

Safety Dot—Braille Indications for Staircase Handrail by Monocomplex & Jungjoo . . . <http://www.yankodesign.com/2011/03/28/handrails-that-speak/> Jun. 14, 2013.

Institute for Entrepreneurship. PolyU—Technology Frontier <http://www.polyu.edu.hk/ife/corp/en/publications/tech_front.php?tfid=4355> Jun. 14, 2013.

EP 13175757.7 Extended European Search Report dated Sep. 30, 2013.

EP 13175760.1 Extended European Search Report dated Jan. 28, 2014.

Dippel, Kimberly, "Human Factors Analysis on Creating an Inclusive Aircraft Lavatory Environment for Blind and Visually Impaired People," Bachelor Thesis, Hochschule Fur Angewandte Wissenschaften, Hamburg, Fajultat Technik und Informatik. Department Fahrzeugtechnik & Flugzeugbau, Feb. 29, 2012.

* cited by examiner

ORIENTATION FOR VISUALLY IMPAIRED PASSENGERS ON-BOARD A VEHICLE

FIELD OF THE INVENTION

The present invention relates to guiding and providing orientation for visually impaired passengers on-board a vehicle, and relates in particular to a vehicle guidance system for guiding visually impaired passengers on-board a vehicle, to a vehicle, and to a method for guiding visually impaired passengers on-board a vehicle, as well as to a use of a vehicle guidance system on-board an aircraft.

BACKGROUND OF THE INVENTION

Persons with limitations in relation with their eyesight, for example blind persons and visually impaired persons, have difficulties when being situated in a new location, such as when entering a vehicle for travelling purposes, for example. Due to the limited or even non-existing eyesight, these users, i.e. these passengers, orient themselves for example by a blindman's stick. Another way of orientation is to rely on acoustic impression. However, in relation with getting on-board a vehicle, for example when embarking and disembarking a train or aircraft, visually impaired persons are confronted with a stressful situation, since these moments are rather hectic, because usually a large number of persons want to enter or exit the vehicle at the same time, which time, in addition, is usually rather limited. For a better service, visually impaired persons may thus be guided by a personal guide, for example, when getting on-board an aircraft. For further support, airlines often allow visually impaired persons, or other handicapped passengers, to enter the aircraft in advance before the usual boarding process starts. However, such boarding processes are not regulated in the same way, for example, in rail traffic or in subways or other tram traffic. A particular challenge for visually impaired passengers is finding the right location on-board the vehicle and the particular services provided, which are regularly located at a number of differing places. In addition, visually impaired passengers also have difficulties in using lavatories on-board of vehicles, for example because functional equipment is not always located at the same place. Further, lavatories are usually used by a visually impaired person alone, and not with a guiding and supporting person, since a lavatory is a place of privacy and intimacy, and also because lavatories on-board of vehicles are usually rather small due to limited available space.

BRIEF SUMMARY OF THE INVENTION

There may thus be a need to provide improved guidance for visually impaired passengers in lavatory situations on-board of vehicles.

It should be noted that the following described aspects of the invention apply also for the vehicle guidance system for guiding visually impaired passengers on-board a vehicle, for the vehicle, and for the method for guiding visually impaired passengers on-board a vehicle, as well as for the use of a vehicle guidance system on-board an aircraft.

According to the present invention, a vehicle guidance system for guiding visually impaired passengers on-board a vehicle is provided. The vehicle guidance system comprises an interior space on-board the vehicle with at least one lavatory with enclosing cabin walls, and at least one guiding sanitary-handrail. The guiding sanitary-handrail is mounted along at least a part of the enclosing cabin walls inside the lavatory. The guiding sanitary-handrail is provided as a tactile guide, wherein the guiding sanitary-handrail is provided with visually highlighted information related to cabin information, as well as with manually touchable information related to cabin information. Further a plurality of operating elements for controlling functions of the lavatory is provided inside the lavatory. At least a part of the operating elements is arranged on the guiding sanitary-handrail.

As an advantage, the visually impaired passenger is provided with a situation inside the lavatory where an orientation aid as well as the operating elements are arranged on a single component, namely the guiding sanitary-handrail. Thus, the orientation as well as the operational of certain functions is facilitated, in particular for visually impaired passengers. Thus, the stay in the lavatory is improved for the user with respect not only to orientation, but also with respect to comfort.

The term "visually impaired passengers" relates to passengers with reduced or limited eyesight, to blind or nearly blind passengers. The term "visually impaired passengers" also relates to passengers with reduced mobility due to various reasons. The term "visually impaired passengers" relates in particular to handicapped persons. The term also relates to elderly persons and other passengers who experience the feeling of uncertainty and anxiety when onboard a vehicle, e.g. on board an aircraft. The term thus relates to persons with limitations, which are also called special user groups.

The "guiding handrail" relates to a (guiding) rail that provides manually tactile information for guidance purposes. The rail, i.e. the "guiding handrail", is thus also referred to as "manual tactile rail".

In an example, the rail, i.e. the "guiding handrail", is a rail touchable with the fingers for perceiving the information. The guiding rail is thus also referred to as "guiding fingertip rail".

In another example, the rail, i.e. the "guiding handrail", is a rail that the user can hold to, while, of course, the rail is also touchable with the hands and fingers for perceiving the information. Thus, the term "guiding handrail" is used. Further, the rail is referred to as "guiding handhold" (see also below).

The "visually highlighted information" relates to information provided, for example, with enhanced contrast to the surrounding surface portions. For example, information is presented in a field with a bright colour such that a visually impaired person can see the field as an important field from a distance as an orientation. He or she can then look closer for the information indicated. The information may be indications about location of certain operating elements, or an indication of the operational elements and the respective functions provided.

The "manually touchable information" relates to information that is communicated to the passenger by feeling and touching a respectively provided surface. In an example, the surface is provided with a coded relief, such as the Braille system, or with symbols that can be perceived by feeling and touching.

The term "cabin information" relates to information about the provision of functional and service elements in the lavatory space, but also inside the other spaces of the cabin. The "cabin information" is provided to the passenger in order to help him/her in orientation in the lavatory, and to find functional features or also comfort and safety features in the lavatory.

In an example, the information related to cabin information is an indicator of functions and elements inside the lavatory.

The "cabin information" may be provided as Arabic numbers or Latin letters, or as a coded relief, such as the above mentioned Braille system.

The "lavatory" is also referred to as lavatory room.

In an example, the information related to cabin information provided by the guiding sanitary-handrail are indicators for functional elements. The indicators are arranged on the guiding sanitary-handrail are arranged in vertical alignment with the functional elements that are arranged i) attached to the guiding sanitary-handrail; ii) below the guiding sanitary-handrail; or iii) above the guiding sanitary-handrail, in an example.

In an example, the guiding sanitary-handrail is provided extending at least from an entry area along a washbasin arrangement zone to a cabin wall zone in reach of a toilet area.

The "entry area" is the door area of the lavatory, for example, cabin space enclosing surface portions adjacent to the door opening.

The "washbasin arrangement zone" relates to the area, in which the washbasin is provided, for example a washbasin inserted into a desk-like portion of a horizontal shelf-surface or support-surface.

The term "cabin wall zone in reach of a toilet area" relates to an area that a user can manually in an ergonomically convenient way in relation with the use of the toilet. The term "in reach" relates to an ergonomic convenient position for an average passenger.

In an example, the operation elements are provided on the guiding sanitary handrail in vicinity of the respective user equipment such that the activation is ergonomic for the user, which also considers passengers with reduced mobility, i.e. with a limited motional range.

In an example, the guiding sanitary-handrail is provided along the complete circumference of the lavatory space.

The term "circumference" relates to the surface portions of cabin wall and door segments, as well as equipment surfaces, enclosing the lavatory interior space.

The guiding sanitary-handrail is provided such that it can be reached by a person in a stand-up position and by a person sitting in a wheelchair. For example, the guiding sanitary-handrail is provided in the height of a desk, for example in the height of the upper edge of the washbasin or the horizontal support surface, e.g. shelf surface, in which a washbasin is provided.

The term "lavatory" refers to the total enclosure of a toilet room, rather than a washbasin or a sink. Lavatory is synonymous with restroom or washroom. For example, the term lavatory is used in aviation industry to describe the toilet enclosure. The "toilet" is the actual device to which a person uses for hygienic functions. It is also referred as water closet.

A "lavatory" or "toilet compartment" is thus a facility customarily used by passengers for their hygienic functions and appearance needs. According to the present invention, a "lavatory" includes the complete toilet compartment.

The term "arranged on the guiding sanitary-handrail" relates to the provision of the operating elements along the guiding sanitary-handrail, e.g. the operating elements are mounted onto the guiding sanitary-handrail, or they are attached or otherwise physically connected/linked to the guiding sanitary-handrail. In another example, the operating elements are integrated into the guiding sanitary-handrail, e.g. the operating surface of an operating element is forming a part of the surface of the guiding sanitary-handrail. In other words, the operating elements are provided on the guiding sanitary-handrail, and not on the wall surface.

According to an example, all operating elements inside the lavatory are arranged on the guiding sanitary-handrail.

In other words, for operating the different functions inside the lavatory, the user, e.g. the passenger, finds all the operating elements, such as activation surfaces, switches, control knobs, buttons, push-buttons, touch-activated surfaces and the like, on the guiding sanitary-handrail. The wall and interior furniture surfaces are free from any of such operating elements.

For example, the guiding sanitary-handrail is provided with:
a control element for operating the water faucet;
a control element for a toilet flushing; and/or
control element for a lavatory light.

In a further example, the guiding sanitary-handrail is provided with a control element for a ventilator, or a control element for a hand dryer, or a control element for a soap dispenser.

It must be noted that the above-mentioned control elements can be provided in different combinations, i.e. only a few of them or all of them. In an example, the guiding sanitary-handrail is provided as a longitudinal user interface provided with the operating elements.

As an advantage of arranging all operating elements on the guiding sanitary-handrail, the visually impaired passenger only has to reach out for the guiding sanitary-handrail and is thus provided not only with the guiding information, i.e. for orientation where which function may be found, but also with the actuating buttons or surfaces provided on the guiding sanitary-handrail itself. Thus, the user's interaction or touching is restricted and limited to the guiding sanitary-handrail. This also improves the situation for the visually impaired passenger in terms of hygienic aspects. For example, the user will not mistakenly touch other surfaces that may be insanitary, or contaminated, such as the surrounding surfaces of a toilet. This improves the use of the lavatory under hygienic aspects. The arrangement of all control elements on the guiding sanitary-handrail also provides the advantage that the functional elements, i.e. the supply lines for, for example, electrically activated functions, can be arranged in a bundled manner integrated into the guiding sanitary-handrail. This facilitates the assembly and manufacturing procedures, and is also suitable for retrofitting.

According to an example, the interior space further comprises a service zone with movement areas adjacent to the lavatory, comprising at least one of the group of on-board kitchen areas, washrooms, restrooms, and monuments. The guiding sanitary-handrail is also provided outside the lavatory as a guiding handrail at wall surfaces along a part of the movement areas of the service zone as a continuation of the guiding sanitary-handrail.

According to an example, the tactile guide is provided as a continuous tactile guide throughout the cabin space.

Thus, the visually impaired passenger is provided with a guiding system that helps him/her throughout the cabin of an aircraft, for example, or a cabin of another type of vehicle.

According to an example, a location indicator on the guiding sanitary-handrail is provided as a user interface provided with an actuator that can be manually activated by the passenger. Upon activation, the user interface provides a predetermined signal to an output unit providing assigned additional information to the passenger.

For example, in a lavatory the location indicator is an indicator for functions of the lavatory, such as flushing, light, ventilator, water-tap or soap, hand dryer, and the actuator can be provided by the indicator itself. In a further example, the assigned additional information is predetermined information.

This further supports the transmission or perception of information to the user.

In an example, the additional information is provided such to be perceived in a tactile form, for example by vibrations or other rather small movements, nevertheless providing direction information or other information.

According to an example, the output unit is a loudspeaker providing acoustic information in addition to the visual and tactile information. In one example, the loudspeaker is provided as an on-board loudspeaker in the close vicinity of the actuator. In another example, alternatively or additionally, the loudspeaker is provided remote from the actuator arranged with the passenger. For example, the loudspeaker is provided as a part of a passenger's hearing aid. Alternatively, or additionally, the loudspeaker is provided by a passenger's personal handheld communication device, for example a smartphone or other electronic equipment being capable or wireless communication. The additional information may be provided as one tone or a number of tones, such as melodies etc., or as spoken words. For example, the loudspeaker in the vicinity of the actuator may be provided as a directional loudspeaker with a sound field directed towards the place where the user can be expected actuating the actuator. Further, the loudspeaker's signal can be provided rather silent, since visually impaired passengers usually have a highly trained and thus highly sensible hearing sense.

The provided acoustic information may be the same information that is visual to a normal passenger, i.e. a passenger without visual impairment, or the acoustic information can also comprise additional information, which is not "readable".

According to an example, the guiding sanitary-handrail is also provided as a handhold for passengers.

The handhold is provided as a bar or strut, such that the user can grasp the handhold with the hand. The diameter of the bar or strut is dimensioned according to an average passenger, for example by a 50 percentile male. As a further reference passenger, a 95 percentile male is referred to for determining the dimension of the rail.

The term "50 (or 95) percent male" is used as definition in the field of anthropometry, i.e. measurements of human individuals. The "50 (95) percent male" is also referred to as 50th (95th) percentile and relates to body measurements of individuals where only 50% (5%) are larger, i.e. 50% (95%) stay within the measurements/figures. The exact figures can be taken from, for example, standard definitions such as in the NASA standard 3000T or other norms, for example EN ISO 7250 or DIN 33402.

The term "handhold" refers to the fact that a user can actually hold him- or herself, i.e. the guiding sanitary-handrail is capable of supporting the complete, or nearly complete weight of a passenger. Thus, an additional improvement with regards to safety is provided, since such a handrail can also act as a supporting handle bar also for other passengers.

According to the present invention, also a vehicle is provided, comprising a vehicle structure, a cabin arrangement provided by the vehicle structure, and a guidance for visually impaired passengers on-board the vehicle. The guidance is provided as a vehicle guidance system according to one of the above-mentioned examples. The at least one lavatory is provided by the cabin arrangement.

According to an example, the vehicle is a passenger aircraft, comprising a fuselage structure enclosing the at least one cabin space.

As mentioned above, the vehicle is also provided as a coach (bus), railway carriage or tram/streetcar, or ship.

According to the present invention, also a method for guiding visually impaired passengers on-board a vehicle is provided, comprising the following steps:

a) providing a guiding sanitary-handrail in a lavatory, wherein the guiding sanitary-handrail is a tactile guide with visually highlighted and manually touchable information related to cabin information, wherein the guiding sanitary-handrail is mounted along at least a part of the enclosing cabin walls inside the lavatory, wherein a plurality of operating elements for controlling functions of the lavatory is provided inside the lavatory, and wherein at least a part of the operating elements is arranged on the guiding sanitary-handrail;

b) touching of the guiding sanitary-handrail by a passenger;

c1) perceiving the information related to cabin information by manual sensing thereby providing guiding information; and c2) controlling of lavatory functions by activating at least one of the operating elements.

According to an example, in step b), the passenger feels and manually activates a user interface provided by an actuator on the guiding handrail, and a step d) is provided, in which, upon activation, the user interface is providing a predetermined signal to an output unit; and a step e) is provided, in which the output unit is providing assigned additional information to the passenger.

According to the present invention, also a use of a vehicle guidance system according to one of the above-described examples on-board an aircraft is provided.

According to an aspect of the present invention, a lavatory is equipped with a guiding rail at least along a part of the enclosing surfaces, such that a user who is visually impaired is provided with a guide that not only helps him/her finding the several functional elements inside the lavatory, but that also provides the actuating surfaces themselves. Thus, e.g. at least the most important functions inside the lavatory are easily reachable by a visually impaired passenger. This provides improvement in terms of safety and also comfort, as well as improvement of the hygienic situation for visually impaired passengers.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION

Figure 1:
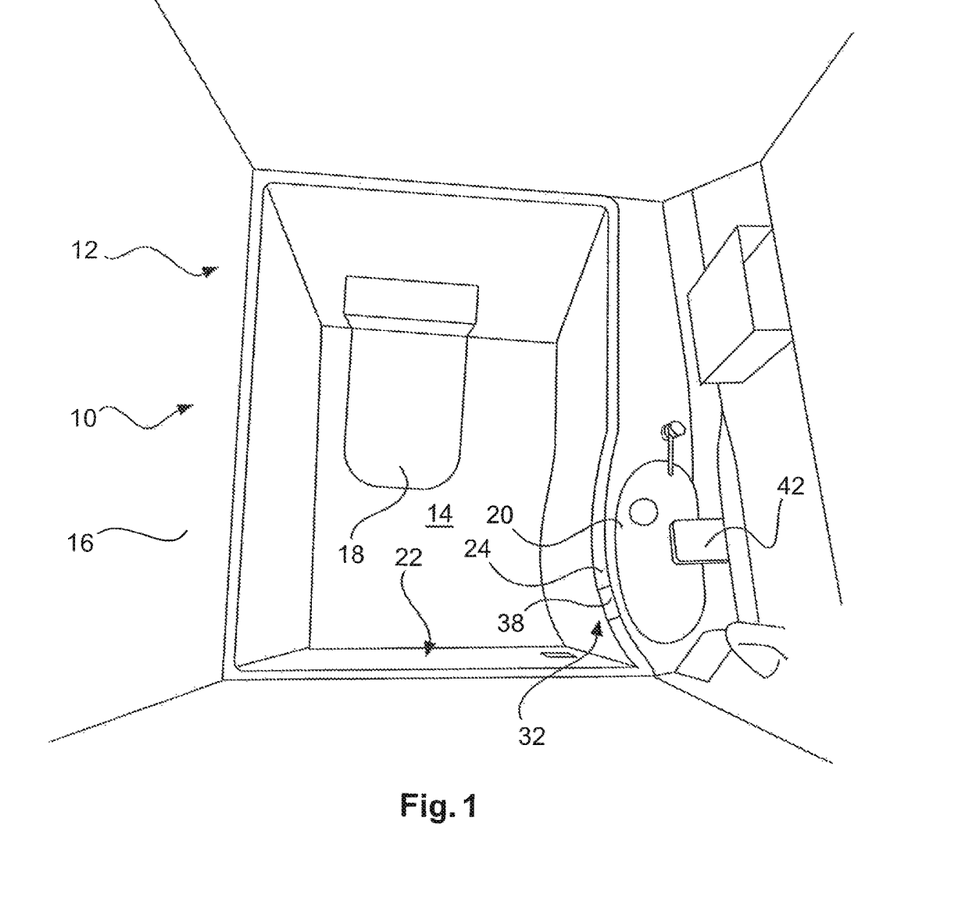
FIG. 1 shows a schematic perspective top view of an example of a vehicle guidance system.

FIG. 1 shows a vehicle guidance system 10 for guiding visually impaired passengers on-board a vehicle. The vehicle guidance system 10 comprises an interior space 12 on-board a vehicle with at least one lavatory 14 with enclosing cabin walls 16. FIG. 1 shows the lavatory 14 in a perspective plan view with a toilet arrangement 18 and an opposite washbasin arrangement 20. Further, a door 22 is also indicated. The vehicle guidance system 10 comprises also at least one guiding sanitary-handrail 24. The guiding sanitary-handrail 24 is mounted along at least a part of the enclosing cabin walls 16 inside the lavatory 14. It must be noted that although various lavatory equipment is shown in FIG. 1, such as the washbasin arrangement 20 and the toilet arrangement 18, this equipment itself is shown as an option, for example a soap dispenser or a toilet paper dispenser.

The guiding sanitary-handrail 24 is provided a tactile guide 26. The guiding sanitary-handrail is provided with visually highlighted information 28, which is also explained further in relation with FIG. 2 and FIG. 3. The visually highlighted information 28 is related to cabin information. The guiding sanitary-handrail 24 is also provided with manually touchable information 30, also related to cabin information. A plurality of operating elements 32 for controlling functions of the lavatory 14 is provided inside the lavatory. According to the invention, at least a part of the operating elements 32 is arranged on the guiding sanitary-handrail 24.

Figure 2:
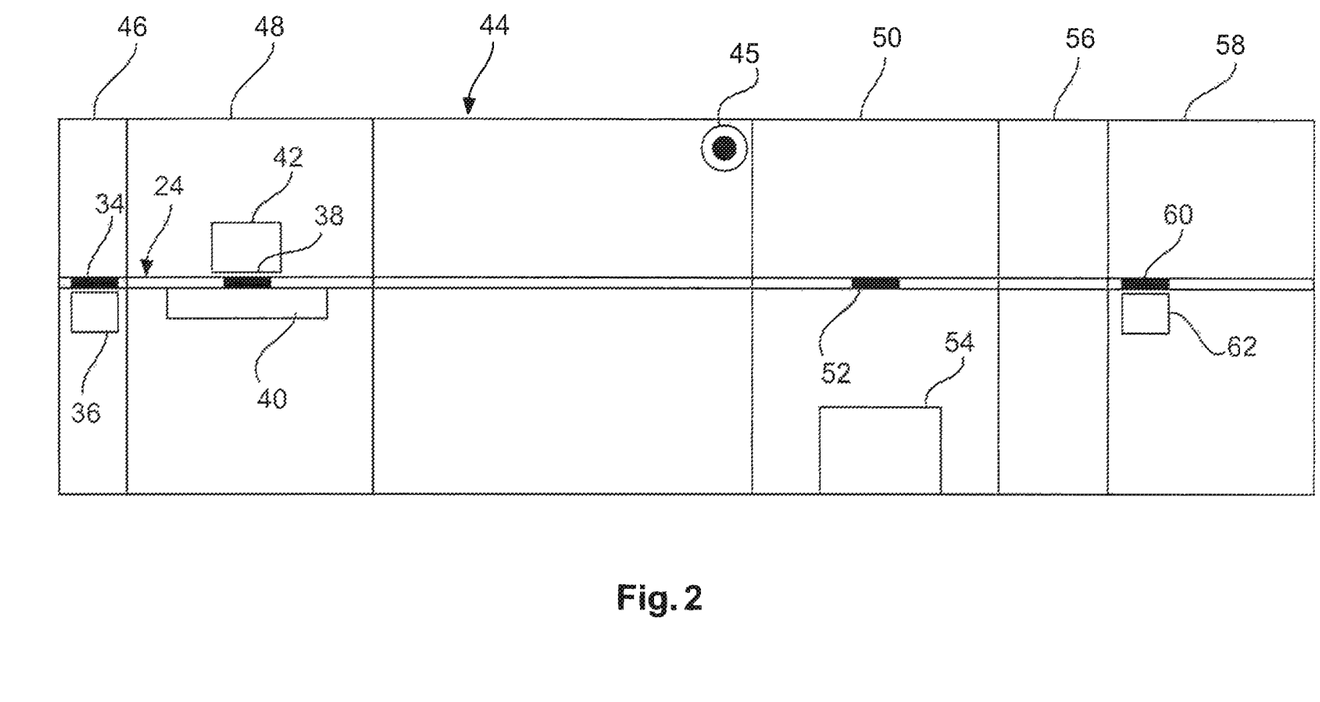
FIG. 2 shows a schematic elevation of wall surfaces inside a lavatory with an example of a vehicle guidance system, in an unfolded illustration.

FIG. 2 shows an elevation in a schematic manner along the surface portions, i.e. the wall portions of the lavatory in an unfolded manner. For example, the guiding sanitary-handrail is mounted along the complete circumference, i.e. along all the enclosing surfaces. In the example shown in FIG. 2, the guiding sanitary-handrail 24 is provided with a first field 34 indicating a waste flap 36 underneath. The area 34, providing the visually highlighted information 28 and the manually touchable information 30 relating to the waste flap 36, may also be provided as a control element for opening the waste flap, for example. Further, along the guiding sanitary-handrail 24, a further field 38 is provided, providing the information relating to a washbasin 40 and a water faucet 42. Further, the control elements for operating the water faucet 42 may also be provided in the field 38. The guiding sanitary-handrail 24 is further provided on a further wall portion 44, as a continuation of a first wall portion 46, and a further wall portion 48, comprising a wash table arrangement, wherein the further wall portion 44 may be used for providing a loudspeaker 45 that provides additional acoustic feedback to the user in one example, where the guiding sanitary-handrail is provided as a user interface 72, which will be described in more detail in relation with FIG. 6 from a functional and schematic point of view.

Along the next wall portion 50, a further portion 52 on the guiding sanitary-handrail 24 is provided, providing information relating to a toilet assembly 54, and also acting as a control element for operating the toilet flush mechanism. Further, after passing a further wall portion 56, a door portion 58 is provided, where a further portion 60 on the guiding sanitary-handrail provides information relating to a door handle 62, and which also serves as an operating element for the door handle 62.

Figure 3:
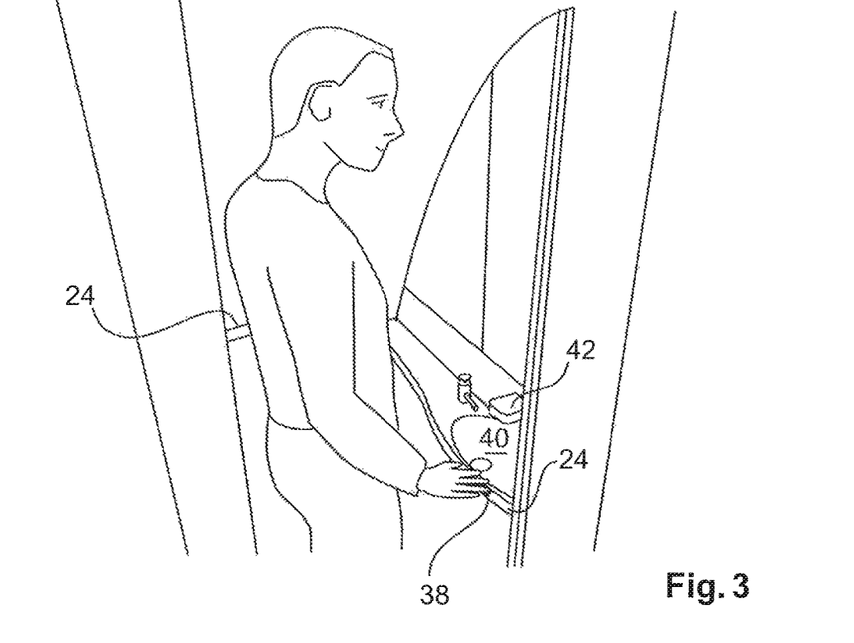
FIG. 3 shows a detailed perspective view of an example of a guiding handrail/guiding sanitary handrail.

FIG. 3 shows a more detailed view of the guiding sanitary-handrail 24 providing the respective visually highlighted information 28 and the manually touchable information 30. Further, as indicated, the guiding sanitary-handrail 24 also comprises a plurality of operating elements 32, for example the above-mentioned operating element 38 for operating the water faucet 42.

In an example, not further shown, a section of the guiding sanitary-handrail 24 comprises the visually highlighted information 28, for example the expression "washbasin" shown in a first colour on a background portion with another colour, which two colours are providing a strong contrast in a visual sense, for example by providing two complementary colours. Further, the manually touchable information is provided, for example, with a relief structure, for example a coded relief, such as the Braille system. Alternatively, the information, for example the term "washbasin", is made as a relief itself. Thus, the guiding handrail 24 serves as a touchable surface that the user can grasp while being in the lavatory, and the user is able to visually perceive the location of information and can then have a closer look, or can then feel in case of a very reduced eyesight or in case of even blindness, in a tactile way, perceiving the information provided by the contoured surface, providing the manually touchable information, together with the possibility to operate and control functions in the lavatory.

Figure 4:
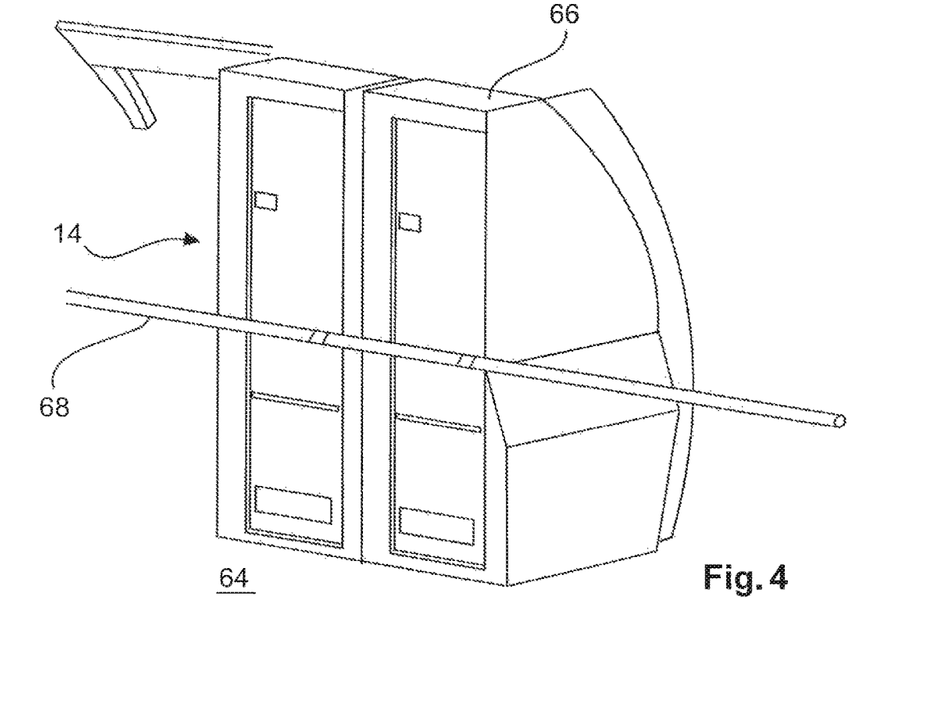
FIG. 4 shows a perspective view of a further example of a vehicle guidance system along other cabin interior elements.

FIG. 4 shows a further example, where the interior space further comprises a service zone 64, with movement areas adjacent to the lavatory, comprising at least one of the group of on-board kitchen areas, washrooms, restrooms, and monuments. For example, stowage monuments 66 are provided in vicinity of the lavatory 14. In addition to the above described arrangement of the guiding sanitary-handrail 24 inside the lavatory 14, a guiding handrail 68 is also provided on the exterior of the lavatory, i.e. on the outside of the lavatory door, and also extending across the stowage monument 66. thus, the guiding sanitary-handrail is provided outside the lavatory at wall surfaces along a part of the movement areas of the service zone as a continuation 69 of the guiding sanitary-handrail in form of the guiding handrail 68.

Figure 5:
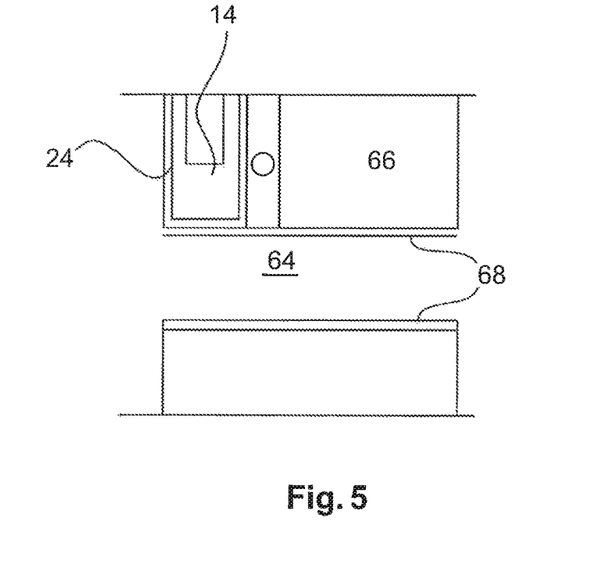
FIG. 5 shows a schematic plan view of a further example of the vehicle guidance system with a continuous tactile guide.

This is further indicated in FIG. 5, where the lavatory 14 is shown in a schematic plan view, with the guiding sanitary-handrail 24 arranged in the lavatory 14. In addition, the guiding handrail 68 is provided on the outside along the movement area of the service zone 64.

In a further example, the tactile guide 26 is provided as a continuous tactile guide throughout the cabin space (not further shown in detail).

Figure 6:
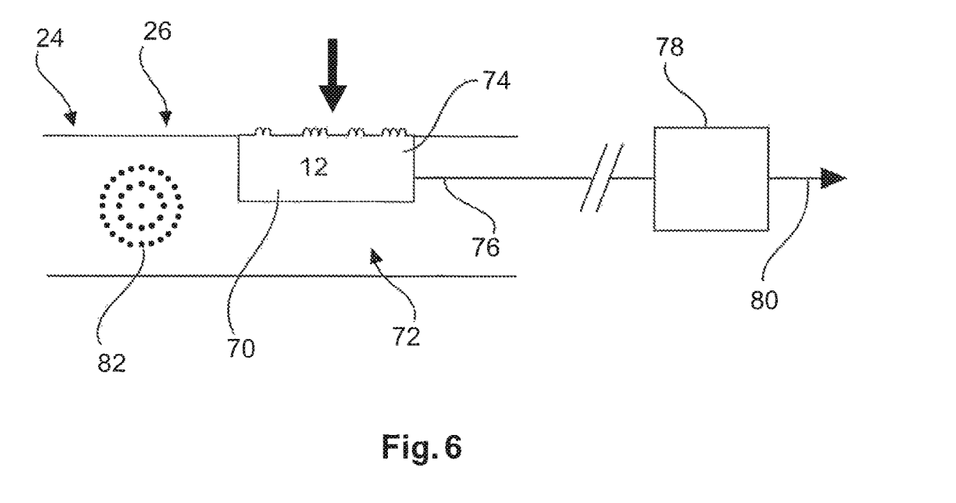
FIG. 6 shows a schematic detailed view of a vehicle guidance system provided with a user interface with an actuator and an output unit.

FIG. 6 shows a detailed section of the tactile guide 26 of the handrail 24, wherein a location indicator 70 is provided on the guiding handrail 24 as a user interface 72 provided with an actuator 74 that can be manually activated by the passenger. Upon activation, the user interface 72 provides a predetermined signal 76 to an output unit 78 providing assigned additional information 80 to the passenger. The signal 76 can be transferred wirelessly or wire-bounded. The output unit 80 may be provided as a loudspeaker (not further shown in detail), wherein the loudspeaker is provided as an on-board loudspeaker in the close vicinity of the actuator 74, for example arranged integrated with the handrail 24, as indicated by a number of little holes 82 in case of an inserted small loudspeaker.

In a further example (not further shown), the loudspeaker is provided as a part of a passenger's hearing aid, and/or by a passenger's personal handheld communication device. For example, a predetermined wireless communication between a hearing aid and an on-board system may be provided for transmitting respective signals to the hearing aid in order to generate a respective acoustic signal, for example a tone, or a number of tones such as a melody or spoken language. A personal handheld communicates device may be a smartphone.

As also indicated in FIG. 6, the guiding handrail 24 is provided as a handhold for passengers in an example.

Figure 7:
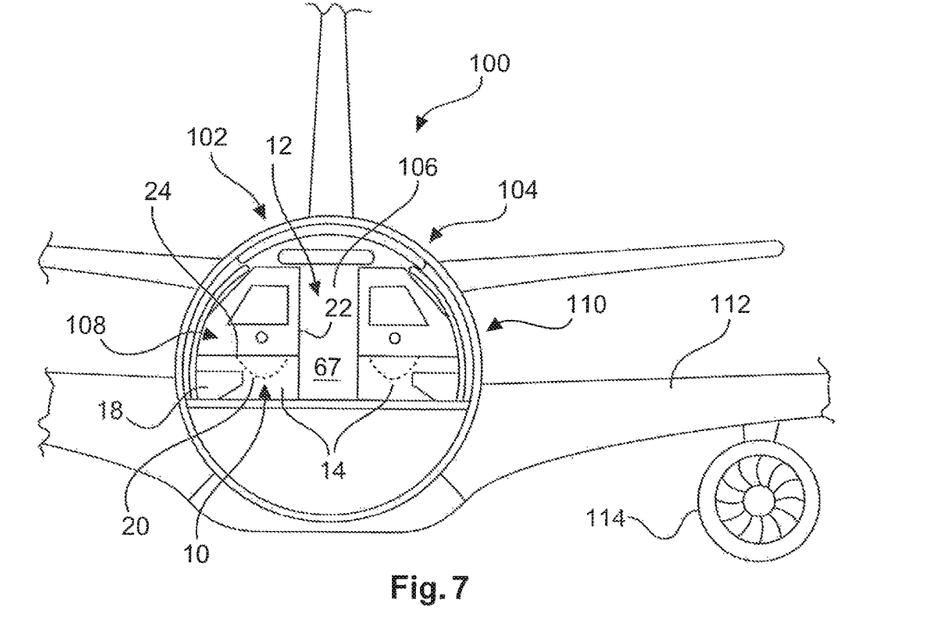
FIG. 7 shows a schematic cross-section through an aircraft as an example for a vehicle.

FIG. 7 shows a vehicle 100, for example in form of an aircraft 102 in a cross-section. The vehicle 100 comprises a vehicle structure 104 and a cabin arrangement 106 provided by the vehicle structure 104. Further, a guidance 108 for visually impaired passengers on-board the aircraft is provided. The guidance is provided as the vehicle guidance system 10 according to one of the above-mentioned examples. The interior space 12 on-board the vehicle is shown with two opposing lavatories 14, for example arranged on two sides of an aisle 76. Inside the lavatories 14, the guiding sanitary-handrail 24 is provided and equipped with a plurality of the operating elements 32 (not further shown in detail). The at least one lavatory 14 is provided by the cabin arrangement 106.

According to an example, also indicated as an option in FIG. 7, the vehicle 100 is a passenger aircraft 102, comprising a fuselage structure 110 enclosing at least one cabin space, i.e. the cabin arrangement 106. As an example, the aircraft 102 is shown with a wing structure 112, and an aircraft engine 114.

It must be noted that the provision of the aircraft 102 as an example of the vehicle 100 is shown as an option. In another example, the vehicle is a coach (bus), railway carriage or tram/streetcar, or ship, like a ferry.

Figure 8:
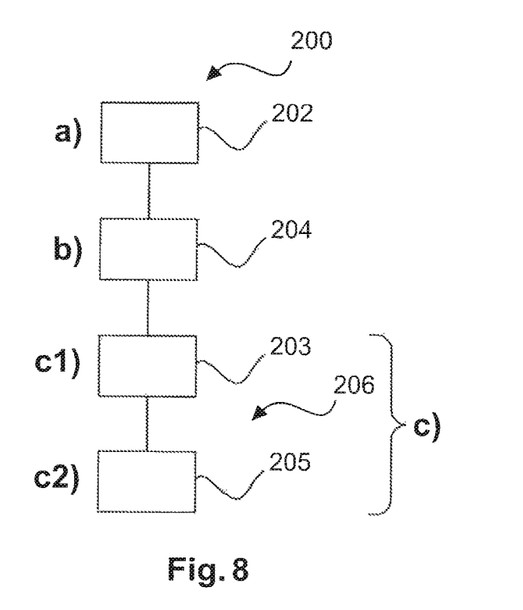
FIG. 8 shows basic steps of an example of a method for guiding visually impaired passengers on-board a vehicle.

FIG. 8 shows a method 200 for guiding visually impaired passengers on-board a vehicle, comprising the following steps:

In a first step 202, a guiding sanitary-handrail is provided in a lavatory, wherein the guiding sanitary-handrail is a tactile guide with visually highlighted and manually touchable information related to cabin information, wherein the guiding sanitary-handrail is mounted along at least a part of the enclosing cabin walls inside the lavatory, wherein a plurality of operating elements for controlling functions of the lavatory is provided inside the lavatory, and wherein at least a part of the operating elements is arranged on the guiding sanitary-handrail.

In a second step 204, the guiding sanitary-handrail is touched by a passenger.

In a third step 206, a first sub-step 203 is provided, in which the information related to cabin information is perceived by manual sensing, thereby providing guiding information. In a second sub-step 205, the user is controlling lavatory functions by activating at least one of the operating elements.

The first step 202 is also referred to as step a), the second step 204 as step b), and the third step 206 as step c), wherein the first sub-step 203 is referred to as step c1), and the second sub-step 205 as step c2).

Figure 9:
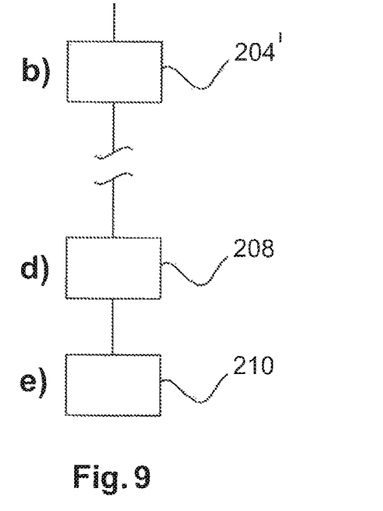
FIG. 9 shows a further example of the method of FIG. 8.

FIG. 9 shows a further example of the method, wherein in step b), the passenger feels and manually activates a user interface provided by an actuator on the guiding handrail. This is indicated by reference number 204'. Further, a step d), indicated with reference number 208, is provided, in which, upon activation, the user interface is providing a predetermined signal to an output unit. Further, a step e), indicated with reference number 210, is provided, in which the output unit is providing assigned additional information to the passenger.

According to an aspect of the present invention, a cabin space in an aircraft, or other type of interior space in a vehicle acting as a cabin zone, is provided considering the needs of visually impaired passengers. Since visually impaired passengers are the second-largest group among persons with reduced mobility (PRMs), this provides improvement also for a large number of passengers, for example in order to find their seats in a shorter time or with reduced stress. Thus, a reduction of boarding time can be achieved. The guiding handrail is provided in an example with visually, optical contrast and the information can thus be provided visually, and also in a haptic manner by touching the information. Further, also an acoustic transmission of the information can be provided, for example by a loudspeaker also in the passenger service unit or others. In an example, the guiding handrail is provided as an illuminated handrail, which further provides orientation also for other passengers, for example during night or during darkened cabin situations.

Visually impaired passengers, provided with a reduction of one of their senses, or channel of sense, i.e. the visual sense, are provided with information and orientation in other forms, for example besides the haptic information aid, also as in form of an auditory information aid.

The present invention provides an adaptable guiding and orientation system and a way of guiding the visually impaired passengers through a vehicle, such as an aircraft. Communication interfaces are provided, in addition to operating interfaces, as interfaces of a human-machine-interface. By the provision of the guiding sanitary-handrail in a lavatory, for example along the complete circumference, or at least along the major parts of the circumference, an additional function is provided that can be combined with the approach of providing a continuous horizontal line for a so-called clean monument appearance on a cabin level, as well as providing advantages for interior/equipment integration on a module level.

The support rail for user guidance also acts as a position identification device, helping blind and visually impaired persons. Due to ergonomic positioning, the guide rail is clearly visible and also touchable for all users. By providing feedback solutions with visual (graphical), haptic (tactile), and acoustic information, a multiple redundant information transformation is provided, in particular useful for passengers where at least one of the sensing channels, i.e. one of the sensory organs, is reduced or even not existing, such as blind persons. The touchable aspect can also be further supported by providing different surface materials, for example different surface structures, and also by selecting thermal conduction to be different with differing materials. Besides providing communication and operating interfaces for persons with limitations, the same is also applicable for other passengers without limitations. The communication interface is easily understandable also by those who can fully see the arrangement, and it is intuitive due to the linear arrangement for visually impaired passengers.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A vehicle guidance system for guiding visually impaired passengers on-board a vehicle, comprising:
   an interior space on-board the vehicle with at least one lavatory with enclosing cabin walls; and
   at least one guiding sanitary-handrail;
   wherein the guiding sanitary-handrail is mounted along at least a part of the enclosing cabin walls inside the lavatory;
   wherein the guiding sanitary-handrail is provided as a tactile guide;
   wherein the guiding sanitary-handrail is provided with visually highlighted information related to cabin information;
   wherein the guiding sanitary-handrail is provided with manually touchable information related to cabin information;
   wherein a plurality of operating elements for controlling functions of the lavatory is provided inside the lavatory;
   wherein all of the plurality of operating elements inside the lavatory are arranged on the guiding sanitary-handrail, wherein the operating elements arranged on the guiding sanitary-handrail are identified by the respective manually touchable information and visually highlighted information related to the respective cabin information;
   wherein the guiding sanitary-handrail provides a handhold for passengers such that the passengers can hold themselves and the guiding sanitary-handrail is configured for supporting at least nearly the complete weight of a passenger, wherein the handhold is a bar or strut such that a user can grasp the handhold with the hand and the handrail is a rail that the user can hold to, and
   wherein the plurality of operating elements comprises at least an operating element for operating the toilet flushing and an operating element for operating the faucet.

2. The vehicle guidance system according to claim 1, wherein the interior space further comprises a service zone with movement areas adjacent to the lavatory, comprising at least one of the group of on-board kitchen areas, washrooms, restrooms, and monuments; and
   wherein the guiding sanitary-handrail is provided outside the lavatory at wall surfaces along a part of the movement areas of the service zone as a continuation of the guiding sanitary-handrail.

3. The vehicle guidance system according to claim 1, wherein the tactile guide is provided as a continuous tactile guide throughout a cabin space.

4. The vehicle guidance system according to claim 1, wherein a location indicator on the guiding sanitary-handrail is provided as a user interface provided with an actuator that can be manually activated by the passenger; and
   wherein, upon activation, the user interface provides a predetermined signal to an output unit providing assigned additional information to the passenger.

5. The vehicle guidance system according to claim 4, wherein the output unit is a loudspeaker providing acoustic information in addition to the visual and tactile information; and
   wherein the loudspeaker is provided:
   i) as an on-board loudspeaker in the close vicinity of the actuator;
   ii) as a part of a passenger's hearing aid; and/or
   by a passenger's personal handheld communication device.

6. A vehicle comprising:
   a vehicle structure;
   a cabin arrangement provided by the vehicle structure; and
   a guidance for visually impaired passengers on-board the vehicle;
   wherein the guidance is provided as a vehicle guidance system comprising:
   an interior space on-board the vehicle with at least one lavatory with enclosing cabin walls; and
   at least one guiding sanitary-handrail, wherein the guiding sanitary-handrail provides a continuous handhold for passengers, such that the passengers can hold themselves and the guiding sanitary-handrail is configured for supporting at least nearly a complete weight of a passenger, wherein the handhold is a bar or strut such that a user can grasp the handhold with the hand and the handrail is a rail that the user can hold to;
   wherein the guiding sanitary-handrail is mounted along at least a part of the enclosing cabin walls inside the lavatory;
   wherein the guiding sanitary-handrail is provided as a tactile guide;
   wherein the guiding sanitary-handrail is provided with visually highlighted information related to cabin information;
   wherein the guiding sanitary-handrail is provided with manually touchable information related to cabin information;
   wherein a plurality of operating elements for controlling functions of the lavatory is provided inside the lavatory;
   wherein all of the plurality of operating elements inside the lavatory are arranged on the guiding sanitary-handrail, wherein the operating elements arranged on the guiding sanitary-handrail are identified by the respective manually touchable information and visually highlighted information related to the respective cabin information;

wherein the plurality of operating elements comprises at least an operating element for operating the toilet flushing and an operating element for operating the faucet, and wherein the at least one lavatory is provided by the cabin arrangement.

7. The vehicle according to claim 6, wherein the vehicle is a passenger aircraft, comprising a fuselage structure enclosing at least one cabin space.

8. A method for guiding visually impaired passengers on-board a vehicle, comprising:
a) providing a guiding sanitary-handrail in a lavatory; wherein the guiding sanitary-handrail is a tactile guide with visually highlighted and manually touchable information related to cabin information; wherein the guiding sanitary-handrail is mounted along at least a part of the enclosing cabin walls inside the lavatory; wherein a plurality of operating elements for controlling functions of the lavatory is provided inside the lavatory; wherein all of the plurality of operating elements inside the lavatory are arranged on the guiding sanitary-handrail, wherein the operating elements arranged on the guiding sanitary-handrail are identified by the respective manually touchable information and visually highlighted information related to the respective cabin information; wherein the guiding sanitary-handrail provides a continuous handhold for passengers such that the passengers can hold themselves and the guiding sanitary-handrail is configured for supporting at least nearly the complete weight of a passenger, wherein the handhold is a bar or strut such that a user can grasp the handhold with the hand and the handrail is a rail that the user can hold to, wherein the plurality of operating elements comprises at least an operating element for operating the toilet flushing and an operating element for operating the faucet;
b) touching of the guiding sanitary-handrail by a passenger; and
c1) perceiving the information related to cabin information by manual sensing thereby providing guiding information; and
c2) controlling of lavatory functions by activating at least one of the operating elements.

9. The method according to claim 8, wherein, in step b), the passenger feels and manually activates a user interface provided by an actuator on the guiding sanitary-handrail; and
wherein the method further comprises: upon activation, the user interface is providing a predetermined signal to an output unit; and
the output unit is providing assigned additional information to the passenger.

10. The vehicle guidance system according to claim 1,
wherein the guiding sanitary-handrail is provided extending at least from an entry area along a washbasin arrangement zone to a cabin wall zone in reach of a toilet area.

11. The vehicle guidance system according to claim 1,
wherein the guiding sanitary-handrail is provided along the complete circumference of a cabin space.

12. The vehicle according to claim 6,
wherein the guiding sanitary-handrail is provided extending at least from an entry area along a washbasin arrangement zone to a cabin wall zone in reach of a toilet area.

13. The vehicle according to claim 6, wherein the guiding sanitary-handrail is provided along the complete circumference of a cabin space.

* * * * *